United States Patent
Chan et al.

(10) Patent No.: US 10,938,438 B1
(45) Date of Patent: Mar. 2, 2021

(54) RADIO-FREQUENCY CIRCUIT

(71) Applicant: REALTEK SEMICONDUCTOR CORPORATION, Hsinchu (TW)

(72) Inventors: Ka-Un Chan, Hsinchu County (TW); Chih-Lung Chen, Hsinchu County (TW); Chia-Jun Chang, Hsinchu (TW); Po-Chih Wang, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/994,709

(22) Filed: Aug. 17, 2020

(30) Foreign Application Priority Data

Sep. 9, 2019 (TW) .................................. 108132422

(51) Int. Cl.
*H04B 1/44* (2006.01)
*H04B 17/19* (2015.01)

(52) U.S. Cl.
CPC ............... *H04B 1/44* (2013.01); *H04B 17/19* (2015.01)

(58) Field of Classification Search
CPC combination set(s) only.
See application file for complete search history.

(56) References Cited

U.S. PATENT DOCUMENTS

| | | | | |
|---|---|---|---|---|
| 5,337,316 | A * | 8/1994 | Weiss ..................... | H04B 17/19 714/716 |
| 6,006,112 | A * | 12/1999 | Rucki .................... | H04B 17/20 455/561 |
| 6,417,737 | B1 * | 7/2002 | Moloudi ................ | H03B 21/01 330/301 |
| 10,116,399 | B2 * | 10/2018 | Lehtonen ................ | H04B 1/48 |
| 2002/0042894 | A1 * | 4/2002 | Henriksson ............ | H04B 17/29 714/25 |
| 2004/0037353 | A1 * | 2/2004 | Henriksson ............ | H04B 17/19 375/224 |
| 2010/0120369 | A1 * | 5/2010 | Ko ......................... | H03D 7/168 455/67.11 |
| 2018/0254795 | A1 * | 9/2018 | Beamish ................ | H04B 17/19 |
| 2019/0052303 | A1 * | 2/2019 | Kao ....................... | H04B 17/14 |
| 2019/0158137 | A1 * | 5/2019 | Brunel .................... | H04B 1/04 |

* cited by examiner

*Primary Examiner* — Junpeng Chen
(74) *Attorney, Agent, or Firm* — WPAT, PC (57) ABSTRACT

Disclosed is a radio-frequency (RF) circuit capable of performing an RF characteristic test in a test mode. The RF circuit includes: a test signal generator generating a test signal; an RF receiver, coupled to the test signal generator, transmitting the test signal and thereby generating a receiver analog signal; a coupling circuit transmitting the receiver analog signal to an RF transmitter in the test mode; the RF transmitter transmitting the receiver analog signal and thereby generating a transmitter analog signal; a test result generator, coupled between the RF transmitter and a test result output terminal, including a signal converter for generating a converted signal according to the transmitter analog signal in the test mode, wherein the output signal at the test result output terminal is the converted signal or originated therefrom and relates to the result of the RF characteristic test.

20 Claims, 5 Drawing Sheets

RADIO-FREQUENCY CIRCUIT

BACKGROUND OF THE INVENTION

1. Field of the Invention

The present disclosure relates to a radio-frequency (RF) circuit, especially to an RF circuit capable of performing an RF characteristic test.

2. Description of Related Art

Generally, a pure radio-frequency (RF) circuit doesn't include a digital baseband circuit, analog-to-digital converter (ADC), and digital-to-analog converter (DAC) and can't perform an RF characteristic test alone. Therefore, the current techniques can't measure the RF characteristics of a pure RF circuit with a chip/die probing test (CP test) in an early stage when this pure RF circuit is still a chip/die. In addition, the equipment for a general CP test is low end equipment, and such equipment is used for measuring direct-current (DC) characteristics but is incapable of measuring RF characteristics. In light of the above, the current techniques usually test a pure RF circuit after it is packaged and included in a device including an ADC and DAC, and then filter out this pure RF circuit if it fails to pass the test. However, if there exists a technique capable of testing pure RF circuits before they are packaged, those failing to pass the test can be filtered out in an early stage and the total package and test cost can be reduced.

SUMMARY OF THE INVENTION

An object of the present disclosure is to provide a radio-frequency (RF) circuit. This RF circuit can perform an RF characteristic test without the need to use an analog-to-digital converter (ADC) and digital-to-analog converter (DAC) and the need to use high end RF equipment.

An embodiment of the RF circuit of the present disclosure is capable of performing an RF characteristic test in a test mode without the need to use an ADC and DAC and the need to use high end RF equipment. This embodiment includes a test signal generator, an RF receiver, a receiving switch, a transmitting switch, a coupling circuit, an RF transmitter, and a test result generator. The test signal generator is configured to generate a test signal in the test mode. The RF receiver is coupled to the test signal generator and configured to transmit the test signal to generate a receiver analog signal in the test mode. The receiving switch is coupled between the RF receiver and an analog signal input terminal and configured to be turned off in the test mode and turned on in an operation mode, wherein the analog signal input terminal is used for being coupled to an ADC. The transmitting switch is coupled between an analog signal output terminal and the RF transmitter and configured to be turned off in the test mode and turned on in the operation mode, wherein the analog signal output terminal is used for being coupled to a DAC. The coupling circuit is coupled with the RF receiver and the RF transmitter and configured to be turned on in the test mode and turned off in the operation mode so as to transmit the receiver analog signal to the RF transmitter in the test mode. The RF transmitter is configured to transmit the receiver analog signal and thereby generate a transmitter analog signal in the test mode. The test result generator is coupled between the RF transmitter and a test result output terminal and includes a signal converter. The signal converter is configured to generate a converted signal according to the transmitter analog signal in the test mode, wherein the converted signal or a derivative signal originated from the converted signal is the output signal of the test result output terminal and the output signal relates to the result of the RF characteristic test.

Another embodiment of the RF circuit of the present disclosure includes a test signal generator, an RF transmitter, a coupling circuit, an RF receiver, a test result generator, a receiving switch, and a transmitting switch. The test signal generator is configured to generate a test signal in the test mode. The RF transmitter is coupled to the test signal generator and configured to transmit the test signal to generate a transmitter analog signal in the test mode. The coupling circuit is coupled with the RF transmitter and the RF receiver and configured to be turned on in the test mode and turned off in an operation mode so as to transmit the transmitter analog signal to the RF receiver in the test mode. The RF receiver is configured to transmit the transmitter analog signal and thereby generate a receiver analog signal in the test mode. The test result generator is coupled between the RF receiver and a test result output terminal and includes a signal generator. The signal converter is configured to generate a converted signal according to the receiver analog signal in the test mode, wherein the converted signal or a derivative signal originated from the converted signal is the output signal of the test result output terminal and the output signal relates to a result of the RF characteristic test. The receiving switch is coupled between the RF receiver and an analog signal input terminal and configured to be turned off in the test mode and turned on in the operation mode, wherein the analog signal input terminal is used for being coupled to an ADC. The transmitting switch is coupled between the RF transmitter and an analog signal output terminal and configured to be turned off in the test mode and turned on in the operation mode, wherein the analog signal output terminal is used for being coupled to a DAC.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present disclosure discloses a radio-frequency (RF) circuit. The RF circuit can perform an RF characteristic test without using any analog-to-digital converter (ADC) and digital-to-analog converter (DAC) and any high-end RF equipment.

Figure 1:
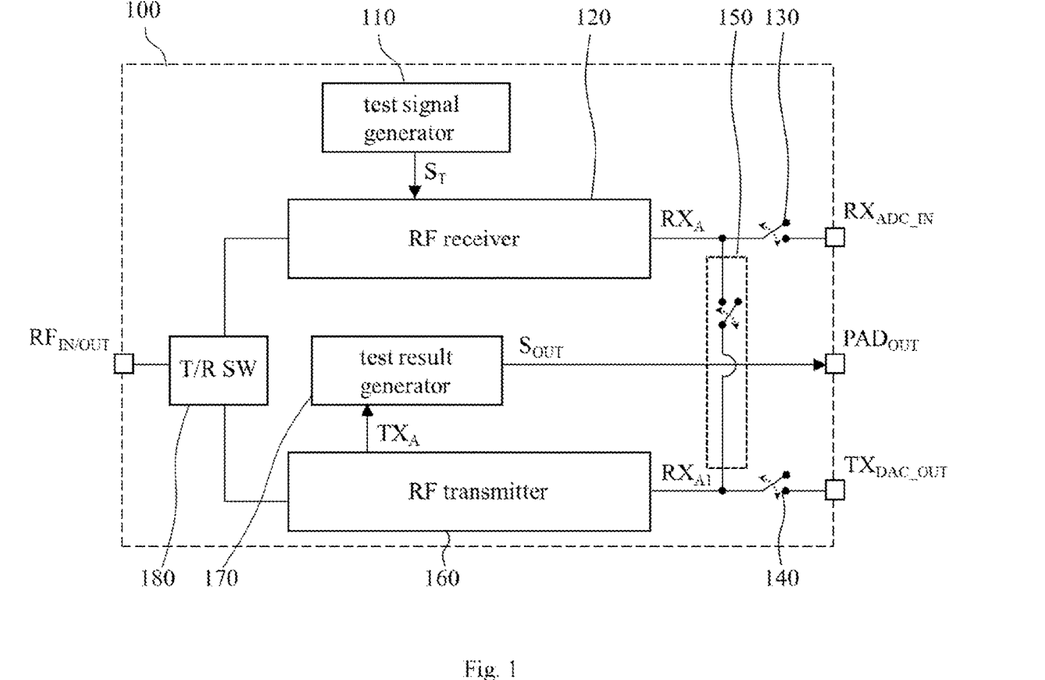
FIG. 1 shows an embodiment of the RF circuit of the present disclosure.

FIG. 1 shows an embodiment of the RF circuit of the present disclosure. The RF circuit 100 of FIG. 1 is operable to perform an RF characteristic test in a test mode, and includes a test signal generator 110, an RF receiver 120, a receiving switch 130, a transmitting switch 140, a coupling circuit 150, an RF transmitter 160, a test result generator 170, and an RF signal input/output circuit (T/R SW) 180. In this embodiment, the RF circuit 100 is a die that is an integrated circuit without package, and the RF characteristic test is a chip probing test; however, the present invention is not limited thereto.

Please refer to FIG. 1. The test signal generator 110 is configured to generate a test signal $S_T$ in the test mode. An embodiment of the test signal generator 110 includes a single tone signal generator operable to generate a single tone signal as the test signal $S_T$. For example, the single tone signal generator includes a phase-locked loop operable to generate a clock signal as the test signal $S_T$ according to a reference clock. The characteristic (e.g., frequency and amplitude) of the test signal $S_T$ can be determined in accordance with the demand for implementation (e.g., the position at which the test signal generator 110 is set in the RF circuit 100).

Figure 2:
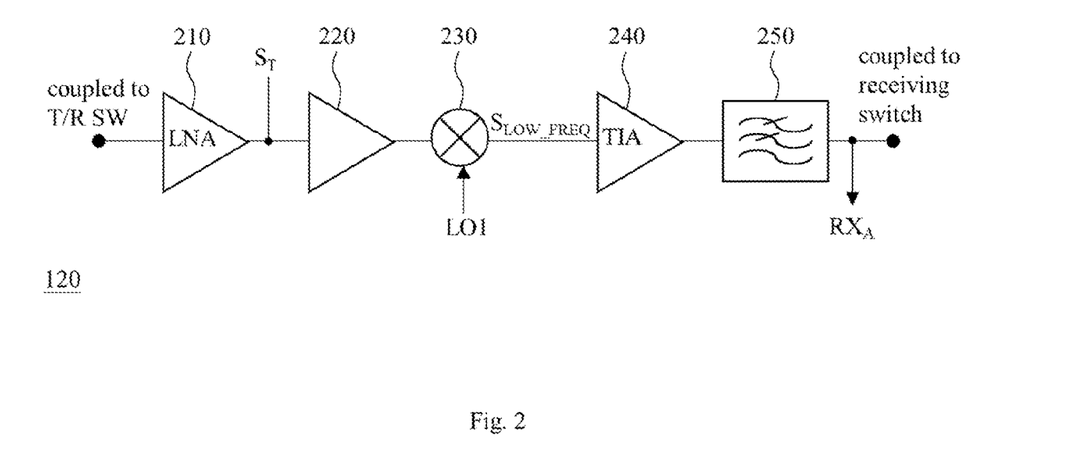
FIG. 2 shows an embodiment of the RF receiver of FIG. 1.

Please refer to FIG. 1. The RF receiver 120 is coupled to the test signal generator 110 and operable to transmit the test signal $S_T$ and thereby generate a receiver analog signal $RX_A$. FIG. 2 shows an embodiment of the RF receiver 120 including a low noise amplifier (LNA) 210, a buffer circuit 220 (e.g., an LNA), a mixer 230, a transimpedance amplifier (TIA) 240, and a filter 250. Each of the buffer circuit 220, the transimpedance amplifier 240, and the filter 250 can optionally be omitted according to the demand for implementation while the other circuits can optionally be incorporated in the RF receiver 120 according to the demand for implementation. In an exemplary implementation, the test signal generator 110 outputs the test signal $S_T$ to a node between the LNA 210 and the mixer 230 so that the mixer 230 can generate a low frequency signal $S_{LOW\_FREQ}$ according to a local oscillating signal LO1 and the test signal $S_T$. The receiver analog signal $RX_A$ is the low frequency signal $S_{LOW\_FREQ}$ or a derivative signal (e.g., the output of the transimpedance amplifier 240 or the filter 250) originated from the low frequency signal $S_{LOW\_FREQ}$; however, the present invention is not limited thereto, which means that the test signal generator 110 can output the test signal $S_T$ to any point of the transmission path of the RF receiver 120 such as a point between the LNA 210 and the RF signal input/output circuit 180 or a point between the mixer 230 and the receiving switch 130 as long as this configuration is practicable. It should be noted that in the embodiment of FIG. 2, the signal between the mixer 230 and the RF signal input/output circuit 180 can be a common differential signal, and the signal between the mixer 230 and the receiving switch 130 can include an in-phase signal and a quadrature-phase signal; since these features are known in this technical field, their detail is omitted here.

Please refer to FIG. 1. The receiving switch 130 is configured to be turned off in the test mode for the RF characteristic test and turned on in an operation mode for a normal operation. The receiving switch 130 is coupled between the RF receiver 120 and an analog signal input terminal $RX_{ADC\_IN}$ that is used for being coupled to an ADC and outputting a signal thereto. The transmitting switch 140 is configured to be turned off in the test mode for the RF characteristic test and turned on in the operation mode for the normal operation. The transmitting switch 140 is coupled between an analog signal output terminal $TX_{DAC\_OUT}$ that is used for being coupled to a DAC and receiving a signal therefrom, and the RF transmitter 160. The coupling circuit 150 (e.g., a transmission line and a switch) is used to be turned on in the test mode and turned off in the operation mode so as to transmit the receiver analog signal $RX_A$ to the RF transmitter 160 in the test mode; the receiver analog signal received by the RF transmitter 160 is named $RX_{A1}$ for differentiation. In the embodiment of FIG. 1, one terminal of the coupling circuit 150 is coupled to a node between the RF receiver 120 and the receiving switch 130 and the other terminal of the coupling circuit 150 is coupled to a node between the transmitting switch 140 and the RF transmitter 160; however, the present invention is not limited thereto, which means the two terminals of the coupling circuit 150 can be coupled to any point of the transmission path of the RF receiver 120 and any point of the transmission path of the RF transmitter 160 respectively as long as this configuration is practicable. For example, the coupling circuit 150 includes a first terminal and a second terminal, the first terminal is coupled to a node between a mixer (e.g., the mixer 230 of FIG. 2) of the RF receiver 120 and a filter (e.g., the filter 250 of FIG. 2) of the RF receiver 120 or to a node between the filter (e.g., the filter 250 of FIG. 2) and the receiving switch 130, and the second terminal is coupled to a node between a mixer (e.g., the mixer 320 of FIG. 3) of the RF transmitter 160 and a filter (e.g., the filter 310 of FIG. 3) of the RF transmitter 160 or to a node between the filter (e.g., the filter 310 of FIG. 3) and the transmitting switch 140.

Figure 3:
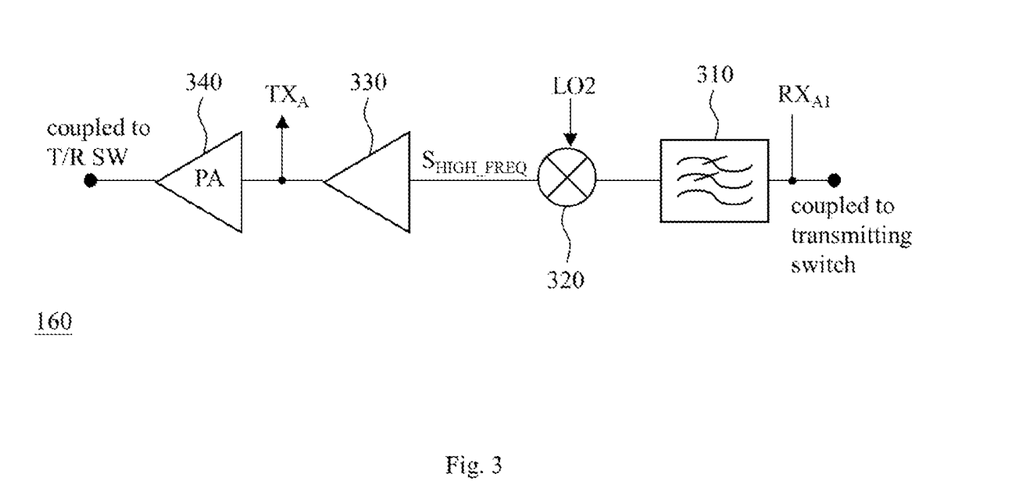
FIG. 3 shows an embodiment of the RF transmitter of FIG. 1.

Please refer to FIG. 1. The RF transmitter 160 is operable to transmit the receiver analog signal $RX_{A1}$ and thereby generate a transmitter analog signal $TX_A$. FIG. 3 shows an embodiment of the RF transmitter 160 including a filter 310, a mixer 320, a gain-stage circuit 330 (e.g., a preamplifier driver (PAD)), and a power amplifier (PA) 340. Each of the filter 310 and the gain-stage circuit 330 can optionally be omitted according to the demand for implementation while the other circuits can optionally be incorporated in the RF transmitter 160 according to the demand for implementation. In an exemplary implementation, one terminal of the coupling circuit 150 is coupled to a node between the filter 310/transmitting switch 140 and the mixer 320 so as to output the receiver analog signal $RX_{A1}$ to the node; therefore, the mixer 320 can generate a high frequency signal $S_{HIGH\text{-}FREQ}$ according to a local oscillating signal LO2 and the receiver analog signal $RX_{A1}$, wherein the frequency of the high frequency signal $S_{HIGH\text{-}FREQ}$ is higher than the frequency of the aforementioned low frequency signal $S_{LOW\_FREQ}$. The transmitter analog signal $TX_A$ is the high frequency signal $S_{HIGH\_FREQ}$ or a derivative signal (e.g., the output signal of the gain-stage circuit 330) originated from the high frequency signal $S_{HIGH\_FREQ}$. In an exemplary implementation, the test result generator 170 is coupled to a node between the gain-stage circuit 330 and the power amplifier 340 so as to receive the transmitter analog signal $TX_A$ from the node and generate an output signal $S_{OUT}$ accordingly; however, the present invention is not limited thereto, which means that the test result generator 170 can be coupled to any point of the transmission path of the RF transmitter 160 such as a point between the power amplifier 340 and the RF signal input/output circuit 180 or coupled to any point between the mixer 320 and the gain-stage circuit 330 as long as this configuration is practicable. It should be noted that the frequency of the test signal $S_T$ (e.g., 2.401 GHz) can optionally be different from the frequency of the second local oscillating signal LO2 (e.g., 2.4 GHz). It should also be noted that in the embodiment of FIG. 3, the signal between the mixer 320 and the RF signal input/output circuit 180 can be a common differential signal, and the signal between the mixer 320 and the transmitting switch 140 can include an in-phase signal and a quadrature-phase signal; since these features are known in this technical field, their detail is omitted here.

Figure 4:
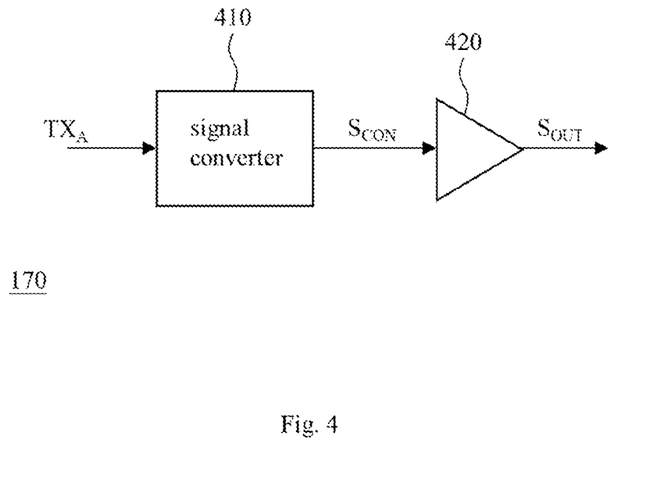
FIG. 4 shows an embodiment of the test result generator of FIG. 1.

Please refer to FIG. 1. The test result generator 170 is coupled between the RF transmitter 160 and a test result output terminal $PAD_{OUT}$. FIG. 4 shows an embodiment of the test result generator 170 including a signal converter 410 and a buffer circuit 420 (e.g., an amplifier), in which the buffer circuit 420 can optionally be omitted according to the demand for implementation. The signal converter 410 is operable to generate a converted signal $S_{CON}$ according to the transmitter analog signal $TX_A$ in the test mode; the output signal Sour of the test result output terminal $PAD_{OUT}$ is the converted signal $S_{CON}$ or a derivative signal (e.g., the output signal of the buffer circuit 420) originated from the converted signal $S_{CON}$, and the output signal relates to the result of the RF characteristic test. In an exemplary implementation, the signal converter 410 includes one of the following circuits: a known or self-developed self-mixer operable to output a voltage strength signal as the converted signal $S_{CON}$ according to the transmitter analog signal $TX_A$; a known or self-developed root-mean-square (RMS) detector operable to output a voltage RMS signal as the converted signal $S_{CON}$ according to the transmitter analog signal $TX_A$; a known or self-developed average detector operable to output a voltage average signal as the converted signal $S_{CON}$ according to the transmitter analog signal $TX_A$; and a known or self-developed power detector operable to output a power signal as the converted signal $S_{CON}$ according to the transmitter analog signal $TX_A$. It should be noted that since the test signal $S_T$ is controllable and the transmission path of the test signal $S_T$ is known in advance, the characteristic (e.g., an average voltage level at a time point or in a predetermined period) of the output signal $S_{OUT}$ can be estimated in advance; accordingly, the result of the RF characteristic test can be obtained by means of determining whether the characteristic of the output signal $S_{OUT}$ satisfies a predetermined requirement.

Please refer to FIG. 1. The RF signal input/output circuit 180 (e.g., a circulator) is coupled with the RF receiver 120 and the RF transmitter 160 and configured to receive an RF signal from an antenna through a transceiver terminal $RF_{IN/OUT}$ or to output an RF signal to the antenna through the transceiver terminal $RF_{IN/OUT}$. Since the RF signal input/output circuit 180 can be a known or self-developed circuit, its detail is omitted here.

Figure 5:
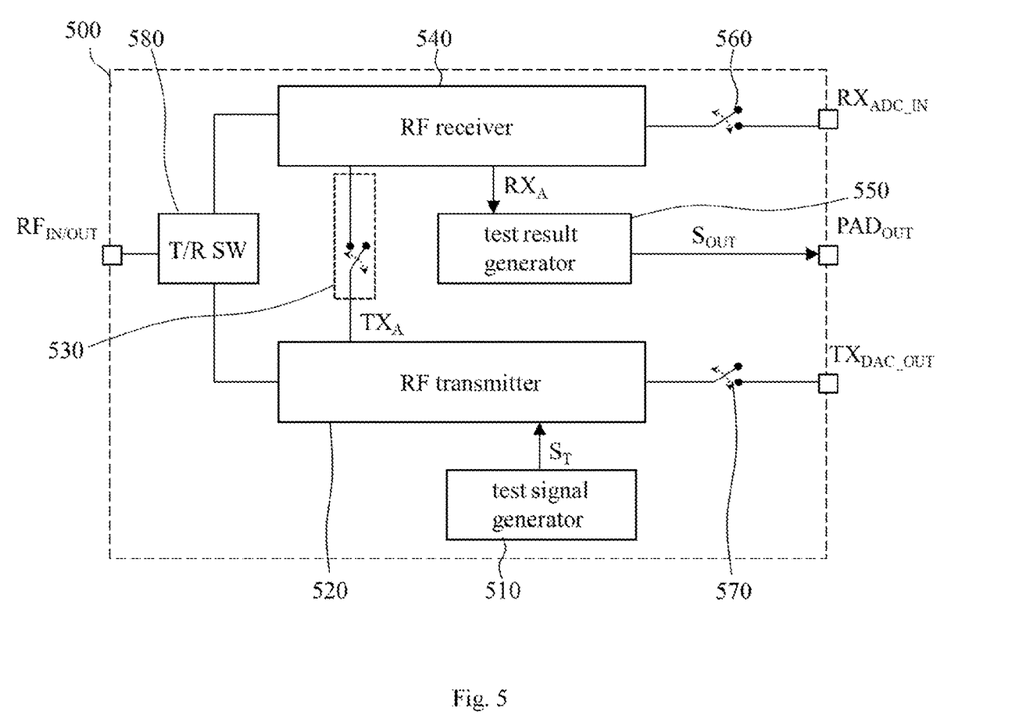
FIG. 5 shows another embodiment of the RF circuit of the present disclosure.

FIG. 5 shows another embodiment of the RF circuit of the present disclosure. The RF circuit 500 of FIG. 5 is capable of performing an RF characteristic test in a test mode and includes a test signal generator 510, an RF transmitter 520, a coupling circuit 530, an RF receiver 540, a test result generator 550, a receiving switch 560, a transmitting switch 570, and an RF signal input/output circuit 580. In this embodiment, the RF circuit 500 is a die that is an integrated circuit without package, and the RF characteristic test is a chip probing test; however, the present invention is not limited thereto.

Please refer to FIG. 5. The test signal generator 510 is configured to generate a test signal $S_T$ in the test mode. The RF transmitter 520 is coupled to the test signal generator 510 and operable to transmit the test signal $S_T$ and thereby generate a transmitter analog signal $TX_A$. The coupling circuit 530 is coupled with the RF transmitter 520 and the RF receiver 540, and operable to be turned on in the test mode and turned off in an operation mode so as to transmit the transmitter analog signal $TX_A$ to an RF receiver 540 in the test mode. The RX receiver 540 is operable to transmit the transmitter analog signal $TX_A$ and thereby generate a receiver analog signal $RX_A$. The test result generator 550 is coupled between the RF receiver 540 and a test result output terminal $PAD_{OUT}$ and includes a signal converter. The signal converter is operable to generate a converted signal $S_{CON}$ according to the receiver analog signal $RX_A$. An output signal $S_{OUT}$ at the test result output terminal $PAD_{OUT}$ is the converted signal $S_{CON}$ or originated from the converted signal. The output signal $S_{OUT}$ relates to the result of the RF characteristic test. The receiving switch 560 is configured to be turned off in the test mode and turned on in the operation mode. The receiving switch 560 is coupled between the RF receiver 540 and an analog signal input terminal $RX_{ADC\_IN}$ that is used for being coupled to an ADC and outputting a signal thereto. The transmitting switch 570 is configured to be turned off in the test mode and turned on in the operation mode. The transmitting switch 570 is coupled between the RF transmitter 520 and an analog signal output terminal $TX_{DAC\_OUT}$ that is used for being coupled to a DAC and receiving a signal therefrom. The RF signal input/output circuit 580 (e.g., a circulator) is coupled between the RF receiver 540 and the RF transmitter 520 and operable to receive an RF signal from an antenna via a transceiver terminal $RF_{IN/OUT}$ or output an RF signal to the antenna via the $RF_{IN/OUT}$. Compared with FIG. 1, the test signal generator 550 of FIG. 5 outputs the test signal $S_T$ to the RF transmitter 520 instead of the RF receiver 540 and thus the test result generator 550 generates the output signal $S_{OUT}$ according to the receiver analog signal $RX_A$ instead of the transmitting analog signal $TX_A$.

Please refer to FIG. 5. In an exemplary implementation, the RF receiver 540 (e.g., the RF receiver 120 of FIG. 2) includes a first mixer (e.g., the mixer 230 of FIG. 2). The first mixer is operable to generate a low frequency signal according to a first local oscillating signal and the transmitter analog signal $TX_A$ in the test mode. The receiver analog signal $RX_A$ is the low frequency signal or originated from the low frequency signal. In an exemplary implementation, the RF transmitter 520 (e.g., the RF transmitter 160 of FIG. 3) includes a second mixer (e.g., the mixer 320 of FIG. 3). The second mixer is operable to generate a high frequency signal according to a second local oscillating signal and the test signal $S_T$ in the test mode. The transmitter analog signal $TX_A$ is the high frequency signal or originated from the high frequency signal. In an exemplary implementation, the coupling circuit 530 includes a first terminal and a second terminal, wherein the first terminal is coupled to a node between the RF signal input/output circuit 580 and the aforementioned first mixer, and the second terminal is coupled to a node between the RF signal input/output circuit 580 and the aforementioned second mixer. In another exemplary implementation, the first terminal is coupled to a node between the first mixer and a low noise amplifier (LNA) (e.g., the LNA 210 of FIG. 2) of the RF receiver 540, and the second terminal is coupled to a node between the second mixer and a power amplifier (e.g., the power amplifier 340 of FIG. 3) of the RF transmitter 520. It should be noted that the two terminals of the coupling circuit 530 can be coupled to any point of the transmission path of the RF receiver 540 and any point of the transmission path of the RF transmitter 520 respectively as long as this configuration is practicable. In an exemplary implementation, the test result generator 550 (e.g., the test result generator 170 of FIG. 4) receives the receiver analog signal $RX_A$ from a first node between the aforementioned first mixer and a first filter (e.g., the filter 250) of the RF receiver 540 or from a second node between the first filter and the receiving switch 560; however, the present invention is not limited thereto, which means that the test result generator 550 can be coupled to any point of the transmission path of the RF receiver 540 as long as this configuration is practicable. In an exemplary implementation, the test signal generator 510 outputs the test signal $S_T$ to a third node between a second filter (e.g., the filter 310 of FIG. 3) and the aforementioned second mixer or to a fourth node between the second filter and the transmitting switch 570.

Since those of ordinary skill in the art can refer to the disclosure of the embodiments of FIGS. 1-4 to appreciate the detail and modification of the embodiment of FIG. 5, which means that some or all of the features of the embodiments of FIGS. 1-4 can be applied to the embodiment of FIG. 5 in a reasonable way, repeated and redundant description is omitted here.

It should be noted that people of ordinary skill in the art can selectively use some or all of the features of any embodiment in this specification or selectively use some or all of the features of multiple embodiments in this specification to implement the present invention as long as such implementation is practicable, which implies that the present invention can be carried out flexibly.

To sum up, the RF circuit of the present disclosure can perform an RF characteristic test without using an ADC, DAC, and external high-end RF transceiver equipment. Therefore, the RF circuit of the present disclosure can be tested when it is still a die without package and thus the total production cost can be reduced.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A radio-frequency (RF) circuit capable of performing an RF characteristic test in a test mode without using an analog-to-digital converter and a digital-to-analog converter, the RF circuit comprising:

a test signal generator configured to generate a test signal in the test mode;

an RF receiver coupled to the test signal generator and configured to transmit the test signal and thereby generate a receiver analog signal in the test mode;

a receiving switch coupled between the RF receiver and an analog signal input terminal and configured to be turned off in the test mode and turned on in an operation mode, wherein the analog signal input terminal is used for being coupled to the analog-to-digital converter;

a transmitting switch coupled between an analog signal output terminal and an RF transmitter and configured to be turned off in the test mode and turned on in the operation mode, wherein the analog signal output terminal is used for being coupled to the digital-to-analog converter;

a coupling circuit coupled with the RF receiver and the RF transmitter and configured to be turned on in the test mode and turned off in the operation mode so as to transmit the receiver analog signal to the RF transmitter in the test mode;

the RF transmitter configured to transmit the receiver analog signal and thereby generate a transmitter analog signal in the test mode; and a test result generator coupled between the RF transmitter and a test result output terminal, the test result generator including: a signal converter configured to generate a converted signal according to the transmitter analog signal in the test mode, wherein the converted signal or a derivative signal originated from the converted signal is an output signal of the test result output terminal and the output signal relates to a result of the RF characteristic test.

2. The RF circuit of claim 1, wherein the test signal generator includes a single tone signal generator.

3. The RF circuit of claim 2, wherein the single tone signal generator includes a phase-locked loop for generating a clock signal as the test signal.

4. The RF circuit of claim 1, wherein the RF receiver includes a first mixer and the RF transmitter includes a second mixer, the first mixer is configured to generate a first frequency signal according to a first local oscillating signal and the test signal in the test mode, the receiver analog signal is the first frequency signal or originated from the first frequency signal, the second mixer is configured to generate a second frequency signal according to a second local oscillating signal and the receiver analog signal in the test mode, the transmitter analog signal is the second frequency signal or originated from the second frequency signal, and a frequency of the first frequency signal is lower than a frequency of the second frequency signal.

5. The RF circuit of claim 1, wherein the RF transmitter includes a second mixer, the second mixer is configured to generate a second frequency signal according to a second local oscillating signal and the receiver analog signal in the test mode, and the transmitter analog signal is the second frequency signal or originated from the second frequency signal.

6. The RF circuit of claim 5, wherein a frequency of the test signal is different from a frequency of the second local oscillating signal.

7. The RF circuit of claim 1, wherein the coupling circuit includes a first terminal and a second terminal, the first terminal is coupled between the RF receiver and the receiving switch, and the second terminal is coupled between the transmitting switch and the RF transmitter.

8. The RF circuit of claim 1, wherein the RF receiver includes a first mixer and a first filter, the RF transmitter includes a second mixer and a second filter, the first filter is set between the first mixer and the receiving switch, the second filter is set between the second mixer and the transmitting switch, the coupling circuit includes a first terminal and a second terminal, the first terminal is coupled to a first node between the first mixer and the first filter or between the first filter and the receiving switch, the second terminal is coupled to a second node between the second mixer and the second filter or between the second filter and the transmitting switch.

9. The RF circuit of claim 1, wherein the signal converter includes one of following circuits: a self-mixer configured to output a voltage strength signal as the converted signal according to the transmitter analog signal; a root-mean-square (RMS) detector configured to output a voltage RMS signal as the converted signal according to the transmitter analog signal; an average detector configured to output a voltage average signal as the converted signal according to the transmitter analog signal; and a power detector configured to output a power signal as the converted signal according to the transmitter analog signal.

10. The RF circuit of claim 1, further comprising an RF signal input/output circuit coupled with the RF receiver and the RF transmitter, wherein the RF receiver includes a first mixer and a low-noise amplifier (LNA), the RF transmitter includes a second mixer and a power amplifier, the LNA is coupled between the RF signal input/output circuit and the first mixer, the power amplifier is coupled between the RF signal input/output circuit and the second mixer, the test signal generator outputs the test signal to a first node between the LNA and the first mixer, and the test result generator receives the transmitter analog signal from a second node between the second mixer and the power amplifier.

11. The RF circuit of claim 1, wherein the RF circuit is a die without package, and the RF characteristic test is a chip probing test.

12. A radio-frequency (RF) circuit capable of performing an RF characteristic test in a test mode, the RF circuit comprising:
- a test signal generator configured to generate a test signal in the test mode;
- an RF transmitter coupled to the test signal generator and configured to transmit the test signal and thereby generate a transmitter analog signal in the test mode;
- a coupling circuit coupled with the RF transmitter and an RF receiver and configured to be turned on in the test mode and turned off in an operation mode so as to transmit the transmitter analog signal to the RF receiver in the test mode;
- the RF receiver configured to transmit the transmitter analog signal and thereby generate a receiver analog signal in the test mode;
- a test result generator coupled between the RF receiver and a test result output terminal, the test result generator including: a signal converter configured to generate a converted signal according to the receiver analog signal in the test mode, wherein the converted signal or a derivative signal originated from the converted signal is an output signal of the test result output terminal and the output signal relates to a result of the RF characteristic test;
- a receiving switch coupled between the RF receiver and an analog signal input terminal and configured to be turned off in the test mode and turned on in the operation mode, wherein the analog signal input terminal is used for being coupled to an analog-to-digital converter; and
- a transmitting switch coupled between the RF transmitter and an analog signal output terminal and configured to be turned off in the test mode and turned on in the operation mode, wherein the analog signal output terminal is used for being coupled to a digital-to-analog converter.

13. The RF circuit of claim 12, wherein the test signal generator includes a clock generator used for generating a clock signal, and the test signal is the clock signal or originated from the clock signal.

14. The RF circuit of claim 12, wherein the RF receiver includes a first mixer and the RF transmitter includes a second mixer, the first mixer is configured to generate a first frequency signal according to a first local oscillating signal and the transmitter analog signal in the test mode, the receiver analog signal is the first frequency signal or originated from the first frequency signal, the second mixer is configured to generate a second frequency signal according to a second local oscillating signal and the test signal in the test mode, the transmitter analog signal is the second frequency signal or originated from the second frequency signal, and a frequency of the first frequency signal is lower than a frequency of the second frequency signal.

15. The RF circuit of claim 12, wherein the RF transmitter includes a second mixer, the second mixer is configured to generate a second frequency signal according to a second local oscillating signal and the test signal in the test mode, and the transmitter analog signal is the second frequency signal or originated from the second frequency signal.

16. The RF circuit of claim 12, further comprising an RF signal input/output circuit coupled with the RF receiver and the RF transmitter, wherein the RF receiver includes a first mixer, the RF transmitter includes a second mixer, the coupling circuit includes a first terminal and a second terminal, the first terminal is coupled to a first node between the RF signal input/output circuit and the first mixer, and the second terminal is coupled to a second node between the RF signal input/output circuit and the second mixer.

17. The RF circuit of claim 12, further comprising an RF signal input/output circuit coupled with the RF receiver and the RF transmitter, wherein the RF receiver includes a first mixer and a low-noise amplifier (LNA), the RF transmitter includes a second mixer and a power amplifier, the LNA is coupled between the RF signal input/output circuit and the first mixer, the power amplifier is coupled between the RF signal input/output circuit and the second mixer, the coupling circuit includes a first terminal and a second terminal, the first terminal is coupled to a first node between the first mixer and the LNA, and the second terminal is coupled to a second node between the second mixer and the power amplifier.

18. The RF circuit of claim 12, wherein the signal converter includes one of following circuits: a self-mixer configured to output a voltage strength signal as the converted signal according to the receiver analog signal; a root-mean-square (RMS) detector configured to output a voltage RMS signal as the converted signal according to the receiver analog signal; an average detector configured to output a voltage average signal as the converted signal according to the receiver analog signal; and a power detector configured to output a power signal as the converted signal according to the receiver analog signal.

19. The RF circuit of claim 12, wherein the RF receiver includes a first filter and a first mixer, the RF transmitter includes a second filter and a second mixer, the first filter is set between the receiving switch and the first mixer, the second filter is set between the transmitting switch and the second mixer, the test result generator receives the receiver analog signal from a first node between the first mixer and the first filter or from a second node between the first filter and the receiving switch, the test signal generator outputs the test signal to a third node between the second filter and the second mixer or to a fourth node between the second filter and the transmitting switch.

20. The RF circuit of claim 12, wherein the RF circuit is a die without package, and the RF characteristic test is a chip probing test.

* * * * *